United States Patent [19]

Bollman et al.

[11] 4,208,957
[45] Jun. 24, 1980

[54] AUTOMATIC FILTER-TYPE COFFEE MAKER

[75] Inventors: Hellmuth Bollman, Bad Homburg; Ernst Heimrath, Neuenhaim, both of Fed. Rep. of Germany

[73] Assignee: Braun AG, Frankfurt am Main, Fed. Rep. of Germany

[21] Appl. No.: 907,412

[22] Filed: May 18, 1978

[30] Foreign Application Priority Data

May 18, 1977 [DE] Fed. Rep. of Germany ........ 2722548

[51] Int. Cl.² ............................................. A47J 31/54
[52] U.S. Cl. ........................................ 99/282; 99/283; 99/299; 99/307; 219/308; 219/511
[58] Field of Search ................. 99/280, 281, 282, 283, 99/299, 300, 307, 304; 219/308, 334, 511

[56] References Cited

U.S. PATENT DOCUMENTS

| | | | |
|---|---|---|---|
| 2,926,234 | 2/1960 | Palmer | 99/281 |
| 3,049,987 | 8/1962 | Bampfer | 99/281 |
| 3,371,592 | 3/1968 | Remy | 99/282 |
| 3,530,787 | 9/1970 | Litterio | 99/281 |
| 3,869,968 | 3/1975 | Ihlenfeld | 99/280 |
| 4,039,772 | 8/1977 | Thorsoe | 99/281 |
| 4,139,761 | 2/1979 | Obrowski | 99/281 |

*Primary Examiner*—Robert W. Jenkins
*Attorney, Agent, or Firm*—Karl F. Ross

[57] ABSTRACT

A coffee maker has a reservoir for water connected to a conduit which terminates above a holder for coffee grounds which sits atop a coffee carafe. A heater is provided in this conduit which can heat the water therein and displace it along the conduit into the coffee-ground holder. The heater is energized for a brief period of time to supply a small quantity of the water to the coffee-ground holder, and is then shut down so that this limited quantity of water can brew with and pass through the ground coffee. Thereafter the heater is again energized to heat and displace the rest of the liquid in the reservoir into the holder.

7 Claims, 6 Drawing Figures

AUTOMATIC FILTER-TYPE COFFEE MAKER

FIELD OF THE INVENTION

The present invention relates to an apparatus for making a beverage and a method of operating same. More particularly this invention concerns an automatic filter-type coffee maker.

BACKGROUND OF THE INVENTION

In recent times the percolator has been increasingly replaced by the automatic filter-type coffee maker. Whereas a percolator simply continuously reboils a small portion of a liquid supply to continuously recirculate it through coffee grounds until the desired strength is obtained, the automatic filter-type coffee maker merely feeds the liquid, which is heated to immediately below the boiling temperature, into a holder in which a quantity of the coffee ground is held. Thus the coffee itself is never boiled, giving it a smoother and less bitter taste, and, at the same time, when a filter paper is used in the holder it is possible to grind the coffee beans more finely and thereby use the coffee more economically.

It has been found that such coffee makers, however, do not produce a coffee which is as aromatic and full in taste as possible. This is mainly due to the fact that the brewing time is relatively short, as the entire quantity of liquid is frequently passed in a very short time through the holder containing the grounds. Thus in the standard automatic filter-type coffee maker the grounds normally float at least partially on the body of hot water in the holder.

OBJECTS OF THE INVENTION

It is therefore an object of the present invention to provide an improved beverage-making apparatus and method of operating same.

Another object is to provide such an apparatus which can make better coffee than the above-described devices.

Yet another object is the provision of such an apparatus which nonetheless functions in a simple and fully automatic manner.

SUMMARY OF THE INVENTION

These objects are attained according to the instant invention in an apparatus for making a beverage such as coffee wherein a conduit has an upstream end opening into a reservoir for a quantity of liquid such as water and a downstream end opening at a holder for dry material such as coffee combinable with the liquid to make the desired beverage. In accordance with the method the conduit is heated so as to pump a predetermined minor portion of the quantity of liquid in the reservoir into the holder. Then the pumping, and therewith the heating, action is stopped and the portion of heated liquid pumped into the holder is allowed to brew with and pass through the dry material therein. Thereafter the displacing action is started again to pass the balance of the liquid in the reservoir through the holder.

In accordance with the instant invention the conduit opens at its downstream end at a level at least slightly above the liquid level in the reservoir and has an upright section along which is provided a heater. Thus this heater will boil the liquid in the upright section of the conduit, forming vapor which rises upwardly in the conduit to entrain liquid therein in the manner of an air-lift pump, with the liquid eventually leaving the conduit at the higher downstream end to drip into the holder for the dry material such as ground coffee.

This can be accomplished in accordance with the invention by providing a simple time-delay switch connected to the flow heater in the conduit. This switch can be constituted as a pair of thermostat-type heat-sensitive switches both of which are closed at room temperature. One of these switches is connected to the flow heater for operating same and the other is connected to a small auxiliary heater for operating it. Thus at the start of the cycle both switches are closed so that the small auxiliary heater juxtaposed with both these switches is energized. After a short time, normally corresponding to the displacement of approximately one-half cup of coffee, the two switches both open as a result of their being heated by the auxiliary heater. These two switches are differently constituted, however, so that after another 30 seconds–60 seconds the switch for the flow heater will again close and allow this flow heater to heat and displace the balance of the liquid in the reservoir into the holder. The switch for the auxiliary heater is set up either only to close at a relatively low temperature which it can only reach when the entire device has shut itself down after brewing a complete pot of coffee, or is set up so as to require manual reclosing at the start of each brewing cycle. Of course such an apparatus is also provided with the standard main on-off switch as well as with a main switch at the reservoir adjacent the flow heater which shuts the flow heater down when same heats beyond a predetermined temperature indicating that the flow heater is empty.

It is also possible in accordance with further features of this invention to provide such a temperature-actuated arrangement which has the flow heater and the auxiliary heater connected in series with each other and with a normally closed heat-sensitive switch operable by the heat of the auxiliary heater. Thus when the device is energized after a predetermined time the auxiliary heater will heat up its normally closed switch and will deactivate both the auxiliary heater and the flow heater. Another normally open thermostatic switch is, however, provided across the auxiliary heater and this last-mentioned switch is activatable by the heat from the flow heater. Thus once the flow heater exceeds a predetermined temperature this switch will close and will shunt out the auxiliary heater. The temperature switching thresholds for these two switches are set up so that the normally closed switch in series with both heaters will open before the normally open switch in shunt with the auxiliary heater will close.

It is also, of course, entirely within the scope of this invention to provide a simple mechanical clock work to shut down the auxiliary heater for between 30 seconds and 60 seconds after starting of the brewing cycle and to start it up again after yet another 30 seconds to 60 seconds. A fully electronic time-delay circuit could also be used, as well as a pneumatically or mechanically biased time-delay switch.

SPECIFIC DESCRIPTION

Figure 1:
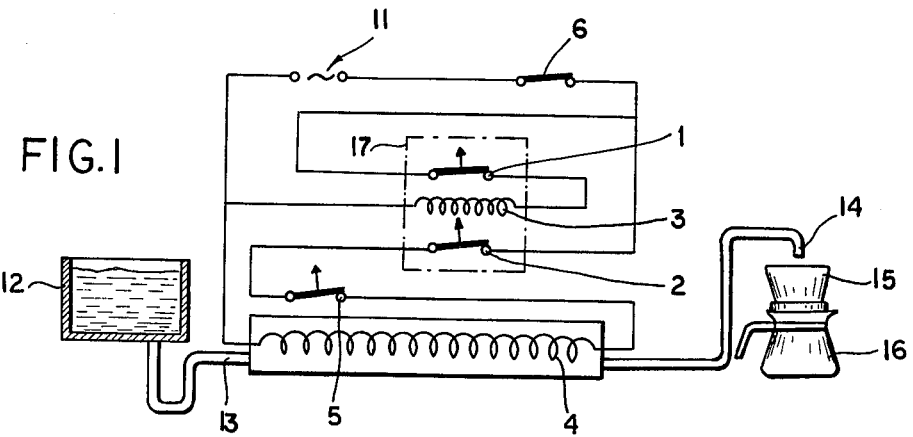
FIG. 1 is a largely diagrammatic view of a coffee maker according to this invention.

A coffee maker according to the instant invention basically comprises a reservoir 12 into which opens a conduit 13 having an upper downstream end 14 opening above a holder 15 adapted to contain a filter and quantity of ground coffee and to sit on a coffee carafe 16. An electric resistance-type flow heater 4 is provided in the conduit 13 so as to act both as a heater for liquid passing through this conduit 13 and as a pump of the gas-lift type. Normally the heater 4 is electrically energized so that water is boiled in the conduit 13 by it and thereby conducted upwardly in the conduit to the end 14 whence it drips into the holder 15. In the holder 15 the hot water mixes with and brews the ground coffee held thereby, eventually to drip from the bottom of the holder 15 into the carafe 16 which normally sits on a continuously energized hot plate.

In accordance with the instant invention as seen in FIG. 1 the heater 4 is connectable through three switches 2, 5, and 6 to a source 11 of electricity, normally line current. The switch 6 is a standard manually operable on-off switch. The switch 5 is a temperature-sensitive switch which opens when the temperature at the heater 4 exceeds a predetermined maximum, normally approximately 110° C., indicating that no water is in the tube 4. The switch 5 closes again only when the tube 4 is cooled to a relatively low temperature indicating that this tube 4 is filled with cold water.

The switch 2 is part of a control unit 17 which comprises in addition to the switch 2 an auxiliary heater 3 and another normally closed switch 1 connected in series across the on-off switch and source of line current. Both of the switches 1 and 2 are of the bimetallic type that open when heated above a predetermined temperature by the auxiliary heater 3. The switch 2, however, can close again automatically when allowed to cool down, absent energization of the heater 3. The switch 1 must be manually reclosed at the end of each brewing cycle, although it is within the scope of this invention to constitute the switch 1 so that it can close at a relatively low temperature generally equal to room temperature.

In accordance with the instant invention the device operates as follows:

At the start of the brewing cycle all of the switches 1, 2, and 5 are normally closed. Closing the switch 6 as shown in FIG. 1 will therefore cause current to flow through the auxiliary heater 3 and the flow heater 4.

Figure 2:
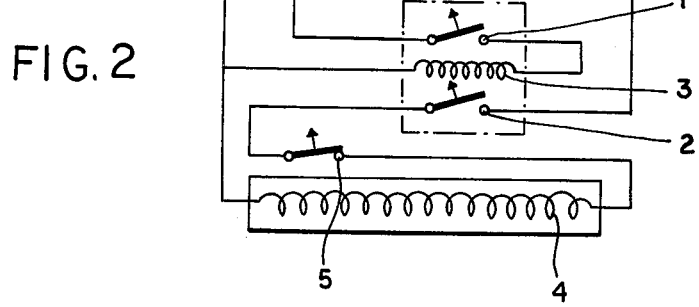
FIGS. 2 and 3 are schematic views of the circuit of the coffee maker of FIG. 1 shown in successive operational positions.

After a predetermined period of time normally equal to between 30 seconds and 60 seconds, and corresponding to the passage of approximately one-half cup of water into the holder 15, the heat from the auxiliary heater 3 causes both switches 1 and 2 to open as shown in FIG. 2. This action therefore deenergizes both of the heaters 3 and 4 so that the portion of liquid fed into the holder 5 will be able to pass through the ground coffee therein brewing with this ground coffee and allowing same to steep.

Figure 3:
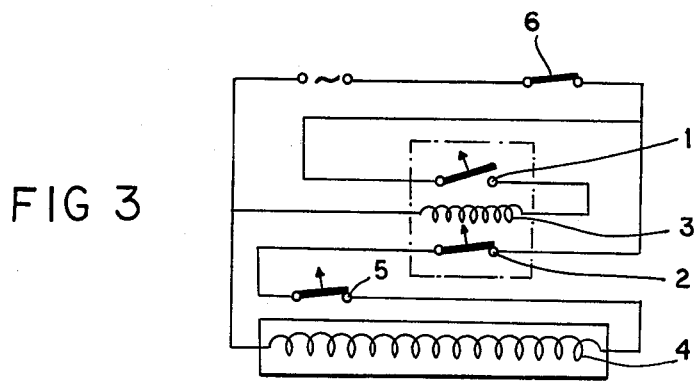

Subsequently after approximately yet another period of between 30 seconds and 60 seconds the switch 2 will automatically again close as shown in FIG. 3. This action will reenergize the heater 4 which will once again heat the liquid and displace it through the conduit 13. Once all of the liquid has been emptied out of the reservoir 12 the temperature will rise in the flow heater 4 to a level sufficient to open the switch 5 and shut down the entire device.

For another brewing cycle the switch 1 will have to be manually reclosed and a new quantity of cold water will have to be poured into the reservoir 12 to cool the heater 4 and close the switch 5.

Figure 4:
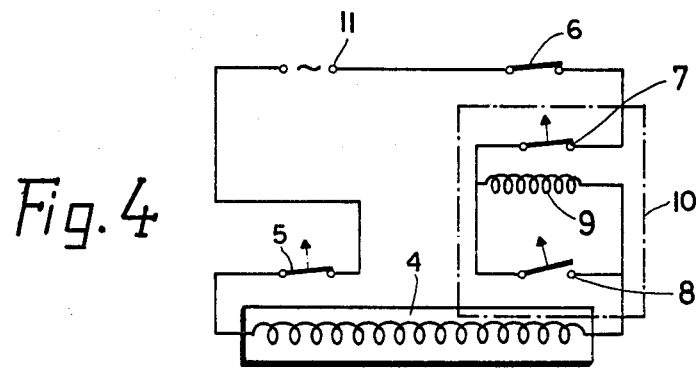
FIGS. 4-6 are schematic views of another coffee maker circuit according to this invention in successive operational positions.
Figure 5:
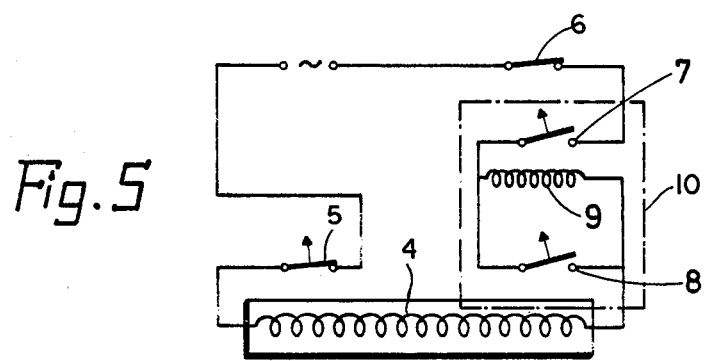
Figure 6:
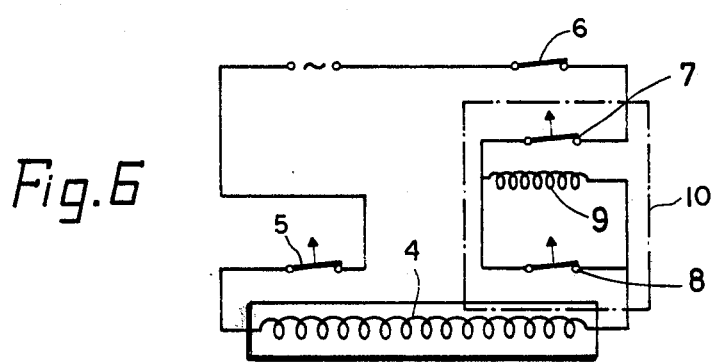

FIGS. 4-6 show another embodiment of the invention wherein structure identical to that of FIGS. 1-3 is identified with the same reference numerals.

Here the unit 17 is replaced by a unit 10 that has an auxiliary heater 9 juxtaposed with a normally closed thermostat-type switch 7 connected in series with it. A normally open thermostat-type switch 8 is provided in the unit 10 which is, however, operable by the heat from the flow heater 4, and which is connected in shunt across the auxiliary heater 9. Furthermore the auxiliary heater 9 and switch 7 are connected in series with the heater 4.

In this arrangement as shown in FIG. 4 at the start of the operation cycle the switch 7 is closed and the switch 8 is open so that current will flow from the source 11 through the switch 7 and through both of the heaters 4 and 9.

After a short period of operation the heat from the heater 9 will cause the switch 7 to open, thereby deenergizing both the auxiliary heater 9 and the main flow heater 4 as shown in FIG. 5.

After yet another short period the heat from the heater 4 will be transmitted to the switch 8 to close same as shown in FIG. 6 and the switch 7 will itself automatically cool down sufficiently to close again. This will have the effect of applying the electricity from the source 11 directly through the switches 7 and 8 to the flow heater 4 which will thereafter function in the manner well known in the art.

As mentioned above it is entirely within the scope of this invention to replace the unit 10 with a simple clock work, electronic timer, or the like. All such variations are included within the scope of the invention. It is also noted that although the discussion above related purely to a coffee maker, the device according to the instant invention could be used to make other types of beverage, including but not limited to soup, cocoa, or tea.

We claim:

1. An apparatus for making a beverage such as coffee, said apparatus comprising:
   a reservoir adapted to hold a supply of a liquid for making the beverage;
   a holder for retaining a supply of dry material combinable with said liquid to make said beverage;
   a conduit extending between said reservoir and said holder;
   heater means along said conduit activatable for heating said liquid and displacing the heated liquid from said reservoir to said holder, whereby the heated liquid combines with the material in said holder to form said beverage; and
   control means connected to the heating and displacing means for sequentially activating same to displace only a portion of the liquid from said supply into said holder, for thereafter temporarily deactivating said heater means to arrest the flow of said liquid through said heater means, and for thereafter reactivating said heater means to displace the remainder of said liquid from said supply into said holder.

2. The apparatus defined in claim 1 wherein said control means includes an auxiliary heater and an auxiliary-heater switch openable by heat from said auxiliary heater and connected in series therewith.

3. The apparatus defined in claim 2 wherein said means for heating includes an electrical main heater, said control means including a main-heater switch connected in series with said main heater, said auxiliary heater and auxiliary-heater switch being connected in parallel with said main heater and said main-heater switch.

4. The apparatus defined in claim 3 wherein said auxiliary-heater switch is manually reclosable.

5. The apparatus defined in claim 3 wherein said auxiliary-heater switch automatically closes substantially at room temperature.

6. The apparatus defined in claim 2 wherein both of said switches are of the bimetallic thermostat type.

7. The apparatus defined in claim 2 wherein said means for heating includes an electrical main heater, said control means including a shunt switch connected in parallel with said auxiliary heater and closable by heat from said main heater, said auxiliary heater, main heater, and auxiliary-heater switch being connected in series.

* * * * *